(12) United States Patent
Blank et al.

(10) Patent No.: US 12,540,835 B2
(45) Date of Patent: Feb. 3, 2026

(54) ROTARY ENCODER AND METHOD OF OPERATING A ROTARY ENCODER

(71) Applicant: JOHANNES HUEBNER FABRIK ELEKTRISCHER MASCHINEN GMBH, Giessen (DE)

(72) Inventors: Thomas Blank, Reichshof (DE); Simon Maiberger, Biebergemuend (DE)

(73) Assignee: JOHANNES HUEBNER FABRIK ELEKTRISCHER MASCHINEN GMBH, Giessen (DE)

( * ) Notice: Subject to any disclaimer, the term of this patent is extended or adjusted under 35 U.S.C. 154(b) by 58 days.

(21) Appl. No.: 18/124,016

(22) Filed: Mar. 21, 2023

(65) Prior Publication Data

US 2023/0304829 A1 Sep. 28, 2023

(30) Foreign Application Priority Data

Mar. 22, 2022 (DE) ............. 10 2022 106 688.6

(51) Int. Cl.
*G01D 5/14* (2006.01)
*B66C 13/46* (2006.01)
*F16C 41/00* (2006.01)

(52) U.S. Cl.
CPC ............ *G01D 5/14* (2013.01); *B66C 13/46* (2013.01); *F16C 41/007* (2013.01)

(58) Field of Classification Search
CPC ....................................................... G01D 5/14
See application file for complete search history.

(56) References Cited

FOREIGN PATENT DOCUMENTS

| CN | 102255434 | A | * | 11/2011 | |
|---|---|---|---|---|---|
| CN | 203423585 | U | * | 2/2014 | |
| DE | 10006223 | A1 | | 8/2000 | |
| DE | 10361886 | B3 | | 1/2005 | |
| DE | 102007036271 | A1 | | 2/2009 | |
| DE | 102012019572 | B3 | | 12/2013 | |
| DE | 102013204399 | A1 | | 9/2014 | |
| DE | 202013102753 | U1 | | 9/2014 | |
| DE | 102018115362 | B3 | | 8/2019 | |
| EP | 1209446 | A1 | * | 5/2002 | ............... G01D 3/08 |
| WO | 2011104084 | A1 | | 9/2011 | |
| WO | 2015090388 | A1 | | 6/2015 | |

* cited by examiner

*Primary Examiner* — Walter L Lindsay, Jr.
*Assistant Examiner* — Milton Gonzalez
(74) *Attorney, Agent, or Firm* — Dickinson Wright PLLC; Andrew D. Dorisio; Nicholas P. Coleman

(57) ABSTRACT

The invention relates to a rotary encoder (10) for a machine, in particular a hoist, crane or the like, and to a method for operating a rotary encoder, the rotary encoder having a rotary encoder shaft (12) which is connectable to a shaft of a machine for detecting a rotation of the shaft, the rotary encoder having a frame (11) which is mountable on a machine, the frame (11) having an encoder element (13) disposed thereon for detecting a rotation of the rotary encoder shaft and a signal output element (14) for outputting a rotation angle signal and/or a speed signal, the rotary encoder having a bearing device (20) by means of which the rotary encoder shaft is rotatably mounted on the frame, the rotary encoder having an insulating device (19) which electrically insulates the rotary encoder shaft and the bearing device from the frame.

14 Claims, 1 Drawing Sheet

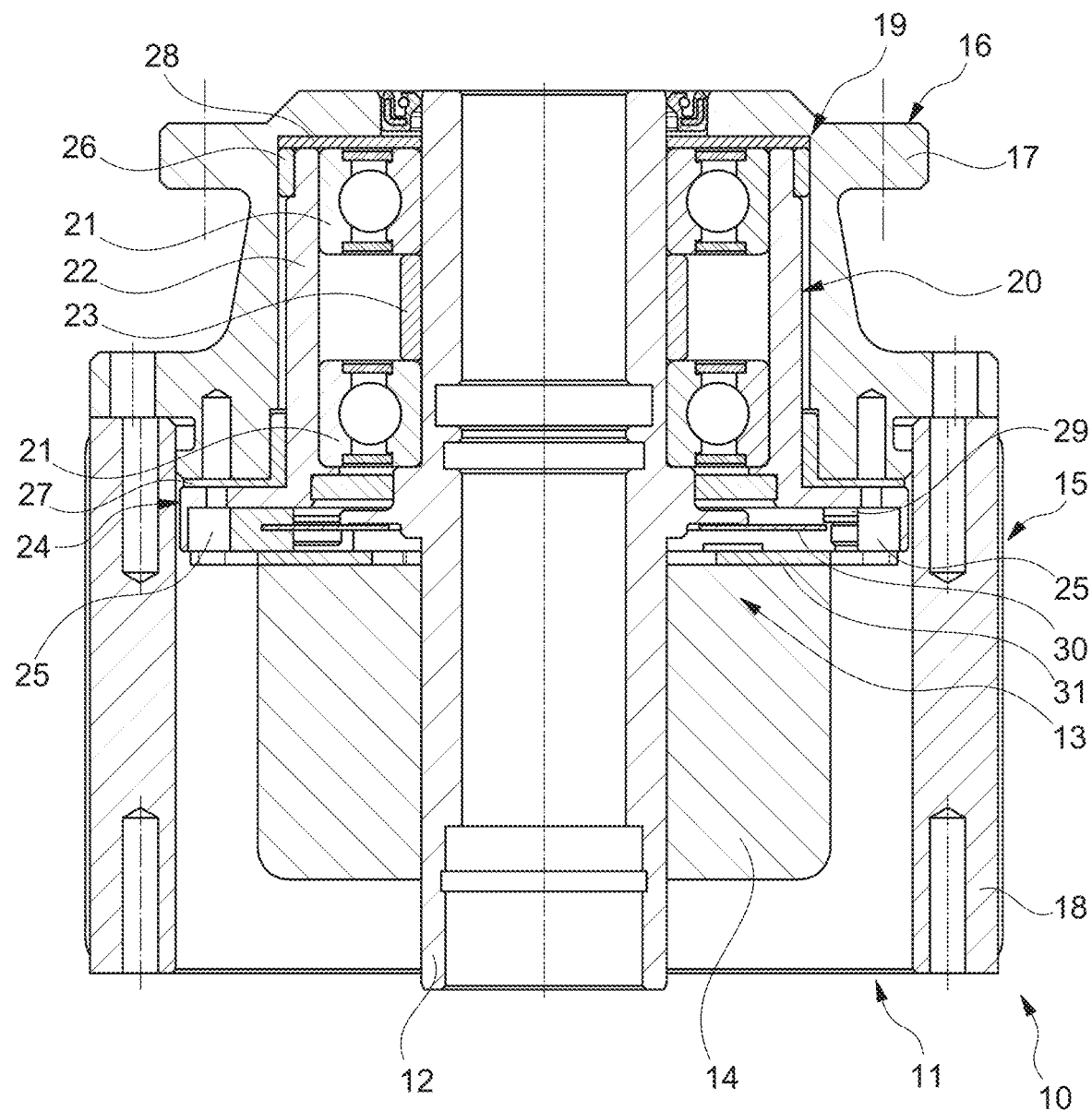

ROTARY ENCODER AND METHOD OF OPERATING A ROTARY ENCODER

TECHNICAL FIELD

The invention relates to a rotary encoder for a machine, in particular a hoist, crane or the like, and to a method for operating a rotary encoder, the rotary encoder being connectable to a shaft of a machine for detecting a rotation of the shaft, the rotary encoder having a frame which is mountable on a machine, the frame having an encoder element disposed thereon for detecting a rotation of the rotary encoder shaft and a signal output element for outputting a rotary encoder signal and/or a speed signal, the rotary encoder having a bearing device by means of which the rotary encoder shaft is rotatably mounted on the frame.

BACKGROUND

Rotary encoders and methods of this kind are well known from the state of the art and are essentially used for detecting the position and speed of an axle or a shaft. A rotary encoder comprises at least a rotary encoder shaft which can be coupled to a machine and a mechanical, optical, capacitive, inductive or magnetic encoder element or detecting element. The encoder element can form an incremental encoder or an absolute encoder, for example. In a mechanical embodiment, the encoder element can be a switch or a meter. The encoder element can generate signals, such as a rotation angle signal or a speed signal, for a rotation of the shaft. A corresponding signal, which can be converted or adjusted to a technical standard via the signal output element, can thus be output based on these signals by means of a signal output element. The signal output element is commonly connected to an evaluation device, a machine control or the like via a wire for signal transmission or even wirelessly. A rotary encoder of this kind is known from DE 10 2013 204 399 A1.

Rotary encoders are used in larges machines or installations, for example, and are subject to great stress during operation. A housing of a rotary encoder is thus commonly made of metal, such that the rotary encoder is comparatively resistant to mechanical and thermal influences. Fastening the rotary encoder is carried out in that the housing is connected to the machine, for example by means of screws. Because of the connection to the machine, there is the problem that compensating or shaft currents flow through the rotary encoder connected to the shaft and thus, bearing damages, in particular with rolling bearings, can occur. To avoid such bearing damages, it is known to connect so-called ground contacts to a shaft in order to ensure a grounding of the shaft via the ground contact and/or a controlled discharge of induced currents, essentially via the ground contact instead of the bearing. As the ground contact is an additional component, its use is not always possible and causes unwanted costs. In addition, high shaft currents cause unwanted power dissipation and higher operating temperatures. Furthermore, it is known for the shaft of the machine to be electrically insulated from the rotary encoder shaft via a coupling. However, insulating couplings of this kind, corresponding insulating adapter shafts or insulating bushings must be manufactured and assembled to high precision in order to minimize possible concentricity errors. Such solutions sometimes require more installation space with corresponding restrictions in the design of mounting interfaces. Furthermore, the resulting forces can lead to increased bearing wear. Depending on the design, insulating couplings can also be subject to only small loads.

With such connections, contamination and moisture can also reduce the resistance of the insulating connections and thus reduce a protective function against shaft currents. Furthermore, insulating bearings are known, but not available for all standardized bearing sizes and designs. The different materials used in these so-called hybrid bearings, for example steel and ceramic, have different coefficients of thermal expansion which limit an operating temperature range. With hybrid bearings, the balls can be made of ceramic or an insulation of an outer bearing shell is formed by a ceramic coating.

SUMMARY

Therefore, the object of the present invention is to propose a rotary encoder, a rotary encoder arrangement and a method for operating a rotary encoder which prevent bearing damages in a simple manner.

The rotary encoder according to the invention for a machine, in particular a hoist, crane or the like, has a rotary encoder shaft which is connectable to a shaft of a machine for detecting a rotation of the shaft, the rotary encoder having a frame which is mountable on a machine, the frame having an encoder element disposed thereon for detecting a rotation of the rotary encoder shaft and a signal output element for outputting a rotation angle signal and/or a speed signal, the rotary encoder having a bearing device by means of which the rotary encoder shaft is rotatably mounted on the frame, the rotary encoder having an insulating device which electrically insulates the rotary encoder shaft and the bearing device from the frame.

Thus, the rotary encoder shaft is rotatably connected to the shaft of the machine, which can be an electric motor, for example. For the purpose of the invention, a shaft is also understood to mean an axle. The shaft can be directly coupled to a drive unit of the machine. In general, however, the rotary encoder shaft can also be rotatably connected to an axle. The frame serves for fastening the encoder element to the machine, the encoder element being disposed on the rotary encoder shaft such that when the rotary encoder shaft rotates, a rotation angle signal and/or a speed signal can be generated, which can be output and also processed by the signal output element. The encoder element and the signal output element can be designed like encoder elements and signal output elements known from the state of the art. Furthermore, the rotary encoder shaft is rotatably mounted on the frame by means of the bearing device. Since the rotary encoder has an insulating device which electrically insulates the rotary encoder shaft and the bearing device from the frame, compensating currents or shaft currents of the shaft and/or the rotary encoder shaft can be prevented from flowing off to the frame and/or components of the machine via the bearing device. It is then no longer necessary to provide an insulated adapter shaft between the rotary encoder shaft and the shaft, specific bearings, couplings or ground contacts. It is possible that an electric potential is generated between the frame and the rotary encoder shaft and/or the bearing device but it cannot be offset easily by means of the bearing device and/or flow off as a current because of the insulating device. Because of the insulating device alone, it thus becomes possible to easily prevent bearing damages, for example on the rotary encoder or a machine, without any additional complex technical measures. Furthermore, the insulating device opens up the possibility to feed in and/or detect an electric signal and/or an electric potential between the rotary encoder shaft and the frame, between the shaft of a machine and the frame, between the bearing device and the frame and/or between the bearing device and the rotary encoder shaft. By means of a measuring element, a change in the electric signal and/or electric potential can be measured and a physical quantity, for example a damage value of a bearing of the rotary encoder shaft, the shaft of a machine and/or the bearing device, can be determined. In particular, a physical quantity or a damage value of the rotary encoder and/or an encoder attachment—including a coupling, an adapter shaft or a torque support—and also a damage value of a machine bearing, for example, can be determined. By insulating the bearing device, all methods for an electric status monitoring of an entire drivetrain can be integrated in the rotary encoder and reduced to a single attachment location.

The insulating device can be formed such that currents induced or fed in in the shaft and/or the rotary encoder shaft are interrupted from being discharged to the frame. Since the frame is usually grounded by the machine during the fitting on the machine, the insulating device can thus prevent that currents flow off to the frame via the bearing device or the rotary encoder shaft. Thus, a status monitoring of the bearing device of the rotary encoder and/or a status monitoring of the rest of the drivetrain through to bearings of the machine can be realized and also separated from each other. If, for example, an insulated coupling or the like is used between the rotary encoder shaft and the shaft of the machine, a contacting of the shaft of the machine can be effected by means of an additional suitable device.

The frame can be formed as a housing in which the encoder element, the signal output element and the bearing device can be accommodated. The housing can be a self-contained housing and/or be realized by multiple pieces. The housing can be designed such that it comprises a flange for the fastening to a machine. A seat for the bearing device can be formed within the housing. The encoder element can be formed by a plate surrounding the rotary encoder shaft and having increments and by a sensor for detecting the increments, such that the rotation angle signal and/or the speed signal can be generated. The signal output element can be formed by a discrete circuit for processing the respective signals and for transmitting them. The encoder element and also the signal output element can be fastened to the housing.

The bearing device can have at least one bearing, preferably a rolling bearing, particularly preferably two or more rolling bearings. It is essential that the rolling bearing is a standardized and/or normalized and also uninsulated rolling bearing which is inexpensive and easily available. The rolling bearing can be a deep groove ball bearing, for example. Alternatively, the bearing device can have at least one plain bearing, preferably two or more plain bearings.

The bearing or rolling bearing can be directly connected to the rotary encoder shaft. A fit, for example a transition fit or an interference fit, can be formed between an outer diameter of the rotary encoder shaft and an inner diameter of the bearing or rolling bearing. The bearing or rolling bearing can thus be in direct contact with the rotary encoder shaft.

The bearing device can comprise a support element which supports and at least partially surrounds the bearing or rolling bearing or a plurality of bearings or rolling bearings. The support element can be formed in the manner of a sleeve, for example, in which the bearing or bearings or rolling bearing is/are inserted. In this case, an outer diameter of the bearing or rolling bearing can be directly connected to an inner diameter of the sleeve by means of a fit, for example a transition fit or an interference fit or an adhesive connection. Thus, mounting the bearing or rolling bearing irrespective of the frame can be facilitated significantly. The support element and/or the sleeve can form a flange via which the support element can be fastened to the frame. The insulating device allows to electrically insulate the support element from the housing while still ensuring a safe and easy mounting of the bearing or rolling bearing. At the same time, it is also possible to use inexpensive rolling bearings, as no special rolling bearing designs are required. The support element can allow a modular design for rotary encoders in such a manner that the support element can be used with different types of rotary encoders. Furthermore, the support element significantly facilitates an electric connection to a wire for feeding in a signal or measuring a potential via the bearings or rolling bearings.

The insulating device can be formed by dielectric material which can be disposed between the frame and the bearing device. The dielectric material then allows the insulating device to be comparatively thin, such that the insulating device does not require a significantly more installation space.

The dielectric material can be plastic, insulating paper, mica or ceramic. Furthermore, other known dielectric materials, such as laminated fabric or printed circuit board material, can also be used. The insulating device can also form air gaps. The dielectric material can also form a surface coating; it can be a paint or an anodic coating, for example.

The insulating device can be formed by a plurality of insulating elements, the bearing device being rigidly connected to the frame via the insulating elements. The insulating elements can be disposed on those positions between the bearing device and the frame on which the bearing device is mounted on the frame and which would otherwise be in contact with the frame.

The insulating device can be formed as at least one sleeve and/or plate. If the bearing device is at least partially forms as a sleeve, the insulating device can surround the bearing device. If an axial surface of the bearing device abuts against the frame, the insulating device can also be partially formed as a plate which abuts against the axial surface. If the insulating device comprises a plurality of insulating elements, these insulating elements can be formed as rings or even as individual plates, for example washers for screws or the like. This is particularly advantageous if the bearing device and/or a support element is screwed to the frame.

Alternatively, the insulating device can be formed by a dielectric material, the support element forming the insulating device. Thus, the support element can be made of the dielectric material, such as plastic or the like, alone. A separate insulating device and/or separate insulating elements are then no longer necessary. This embodiment is particularly advantageous if no large forces are transmitted via the support element.

The rotary encoder arrangement according to the invention comprises a rotary encoder according to the invention and a machine, in particular a hoist, crane or the like, the rotary encoder being connected to a shaft of the machine for detecting a rotation of the shaft. The shaft of the machine can be directly connected to a rotary encoder shaft of the rotary encoder without adapter shafts or other means for mutual electrical insulation of the shafts having to be provided.

In the method according to the invention for operating a rotary encoder for a machine, in particular a hoist, crane or the like, a rotary encoder shaft of the rotary encoder detects a rotation of the shaft, said rotary encoder being connected to a shaft of a machine, an encoder element of the rotary encoder being disposed on a frame of the rotary encoder and detecting a rotation of the rotary encoder shaft, said frame being fastened to the machine, a rotary encoder signal and/or a speed signal being output by means of a signal output element of the rotary encoder, the rotary encoder shaft being rotatably mounted on the frame via a bearing device of the rotary encoder, the rotary encoder shaft and the bearing device being electrically insulated from the frame by means of an insulating device of the rotary encoder. For further details on the advantages of the method according to the invention, reference is made to the description of advantages of the rotary encoder according to the invention.

Furthermore, at least an electric signal and/or an electric potential can be fed in or detected between the rotary encoder shaft and the frame, between the bearing device and the frame, between the shaft of a machine and the frame, and/or between the bearing device and the rotary encoder shaft by means of a measuring element of the rotary encoder. The measuring element of the rotary encoder can be integrated in a housing of the rotary encoder, for example, the housing being formed by the frame. Since the rotary encoder shaft and the shaft of the machine are electrically insulated from the frame by means of the insulating device, an electric potential can form between the rotary encoder shaft and/or the shaft of the machine and the frame. Via the measuring element, a value of this electric potential can be detected and/or measured. In this way, the measuring element can also feed in and/or detect an electric signal, for example a signal with a fixed or variable frequency or an arbitrary signal pattern. In this case, a fed-in signal means a potential which has been generated specifically by means of measuring element. A fed-in signal can be galvanically isolated from the grounding of a machine. This prevents an interference of signals with shaft voltages which have been induced and/or coupled in and can thus increase the accuracy and sensitivity of the measuring element. If the detection is effected for a signal transmitted between the bearing device and the frame, a measured value of the signal can advantageously be generated for the bearing device. The detection can also be effected for a signal transmitted between the shaft of the machine and the frame, a measured value of the signal for the bearing of the shaft and/or the drivetrain being generatable in an advantageous manner. By using different signals in each case, a simultaneous measurement becomes possible. The measuring element can be connected to the signal output element and output a respective measured value via the signal output element. This measured value can be evaluated such that the rotary encoder itself can be used as a measuring apparatus for the electric potential and/or signal. The electric potential and/or signal can be used for determining an operating state of the machine and/or of the rotary encoder.

An electric signal can be generated by means of the measuring element and conducted and measured via at least one bearing, preferably at least one rolling bearing, of the bearing device and/or a bearing of the shaft of the machine. It thus becomes possible to monitor an operating state of the respective bearing in a simple manner. A signal strength can be determined such that the bearing is not damaged by the signal. By insulating the bearing device from the frame, individual bearings of the bearing device or all bearings of the bearing device can be monitored simultaneously. The measuring element can then be directly electrically connected to individual bearings or a support element of the bearing device. For example, in the case of a rolling bearing, the signal can be transmitted via an inner ring, a rolling element and an outer ring of the rolling bearing.

The measuring element can detect and/or store a change in the electric potential and/or signal over an operation period, the measuring element being able to determine and output a physical quantity, for example a load-dependent damage value of a bearing of the shaft of the machine, of the bearing device and/or of an attachment of the machine, including all parts involved in the attachment, such as a coupling, an adapter shaft or a torque support. Depending on the condition of the respective bearings and/or involved parts of the machine, a more or less significant change of the signal and/or potential can occur. If the measuring element generates the electric signal, it can be generated continuously or at intervals. A change of this signal and/or these interference signals and/or the electric potential can easily be determined by a measurement over an operation period. This measurement can be used for determining a damage value and thus for predetermining possible damages to the machine and/or bearing(s). Thus, the measuring element can also serve for monitoring the operating state of the machine.

BRIEF DESCRIPTION OF THE DRAWING

Hereinafter, a preferred embodiment of the invention will be described in more detail with reference to the accompanying drawing.

The FIGURE shows a longitudinal sectional view of a rotary encoder 10 which is essentially formed by a frame 11, a rotary encoder shaft 12, an encoder element 13 and a signal output element 14 (only schematically illustrated). Frame 11 is formed as a housing 15 which can be connected to a machine (not illustrated) via a flange of a first housing part 17. A second housing part 18 is screwed to first housing part 17.

DETAILED DESCRIPTION

Furthermore, rotary encoder 10 has an insulating device 19 and a bearing to device 20 for supporting rotary encoder shaft 12. Insulating device 19 is configured such that rotary encoder shaft 12 and bearing device 20 are electrically insulated from frame 11. Bearing device 20 comprises two rolling bearings 21 which are directly connected to rotary encoder shaft 12. Furthermore, bearing device 20 comprises a support element 22 which is partially formed sleeve-like and accommodates rolling bearing 21. Rolling bearings 21 are directly connected to support element 22 and disposed at a distance via a ring 23. Furthermore, support element 22 forms a flange 24, via which support element 22 is screwed to first housing part 17 by means of screws 25. Insulating device 19 is formed by a dielectric material, such as plastic, for example, and, in this case, formed by a first ring 26, a second ring 27, a plate 28 and a plurality of washers 29 for screws 25. In this way, support element 22 is fully electrically insulated from frame 11. A discharge of currents which might be induced in a shaft (not illustrated) of the machine and/or rotary encoder shaft 12 to frame 11 is thus interrupted. The design of encoder element 13, which is in this case formed by a plate 30 having increments (not shown), plate 30 being fastened on rotary encoder shaft 12, and by a detector (not shown) for detecting the increments, said detector being disposed on a circuit board 31, is not affected by the design of bearing device 20 and insulating device 19.

The invention claimed is:
1. A rotary encoder (10) for a machine, the rotary encoder comprising:
 a rotary encoder shaft (12) connectable to a shaft of the machine for detecting a rotation of the shaft:
 a frame (11) mountable on the machine, wherein the frame (11) comprises an encoder element (13) disposed thereon for detecting a rotation of the rotary encoder shaft and a signal output element (14) for outputting a rotation angle signal or a speed signal;

a bearing device (20) by which the rotary encoder shaft is rotatably mounted on the frame, wherein the bearing device (20) comprises at least two rolling bearings (21), and wherein the bearing device (20) further comprises a support element (22) which supports and at least partially surrounds the at least two rolling bearings, the support element forming a flange (24) by which the support element is adapted to attach to the frame;

an insulating device (19) which electrically insulates the rotary encoder shaft and the bearing device from the frame, wherein the insulating device (19) is configured as at least one sleeve, and wherein the at least one sleeve surrounds the bearing device (20); and wherein the insulating device (19) further comprises a plurality of insulating elements (26, 27, 28, 29), the bearing device (20) being rigidly connected to the frame (11) via the plurality of insulating elements.

2. The rotary encoder according to claim 1, wherein the insulating device (19) is configured such that currents induced in the shaft or the rotary encoder shaft (12) are interrupted from being discharged to the frame (11).

3. The rotary encoder according to claim 1, wherein the frame (11) is formed as a housing (15) in which the encoder element (13), the signal output element (14) and the bearing device (20) are accommodated.

4. The rotary encoder according to claim 1, wherein the at least two rolling bearings are directly connected to the rotary encoder shaft (12).

5. The rotary encoder according to claim 1, wherein the insulating device (19) is formed by a dielectric material which is disposed between the frame (11) and the bearing device (20).

6. The rotary encoder according to claim 5, wherein the dielectric material is plastic, insulating paper, mica or ceramic.

7. The rotary encoder according to claim 1, wherein the insulating device is formed by a dielectric material, the support element forming the insulating device.

8. A rotary encoder arrangement having the rotary encoder (10) according to claim 1, the rotary encoder being connected to a shaft of the machine for detecting a rotation of the shaft.

9. The rotary encoder according to claim 1, wherein the flange extends radially outward from and perpendicular to a longitudinal axis of the rotary encoder shaft.

10. The rotary encoder according to claim 1, wherein the flange is screwed to the frame.

11. A method for manufacturing and operating a rotary encoder (10) for a machine, comprising:

detecting a rotation of a shaft of the machine using a rotary encoder shaft (12) of the rotary encoder;

connecting the rotary encoder shaft (12) to the shaft of the machine;

disposing an encoder element (13) of the rotary encoder on a frame (11) of the rotary encoder and detecting a rotation of the rotary encoder shaft;

fastening the frame (11) to the machine;

outputting a rotation angle signal or a speed signal by means of a signal output element (14) of the rotary encoder;

rotatably mounting the rotary encoder shaft on the frame via a bearing device (20) of the rotary encoder, wherein the bearing device (20) comprises at least two rolling bearings (21), and wherein the bearing device (20) further comprises a support element (22) which supports and at least partially surrounds the at least two rolling bearings, the support element forming a flange (24) by which the support element is adapted to attach to the frame; and electrically insulating the rotary encoder shaft and the bearing device from the frame by an insulating device (19) of the rotary encoder, wherein the insulating device (19) comprises a plurality of insulating elements (26, 27, 28, 29), the bearing device (20) being rigidly connected to the frame (11) via the plurality of insulating elements.

12. The method according to claim 11, further comprising:

detecting at least an electric signal or an electric potential between the rotary encoder shaft (12) and the frame (11), between the bearing device (20) and the frame, between the shaft of a machine and the frame, or between the bearing device and the rotary encoder shaft, by a measuring element of the rotary encoder (10).

13. The method according to claim 12, further comprising:

generating the electric signal by means of the measuring element; and conducting and measuring the electric signal via at least a bearing of the bearing device (20) or a bearing of the shaft of the machine.

14. The method according to claim 12, further comprising:

the measuring element detecting a change in the electric signal over an operation period; and the measuring element determining and outputting a physical quantity of a bearing of the shaft of the machine, of the bearing device (20), or of an attachment of the machine.

* * * * *